June 4, 1968  JEAN-MARIE MASSOUBRE  3,386,809
REACTOR AND MIXER FOR CONTINUOUS POLYMERIZATION
Filed Jan. 27, 1966
FIG.I.
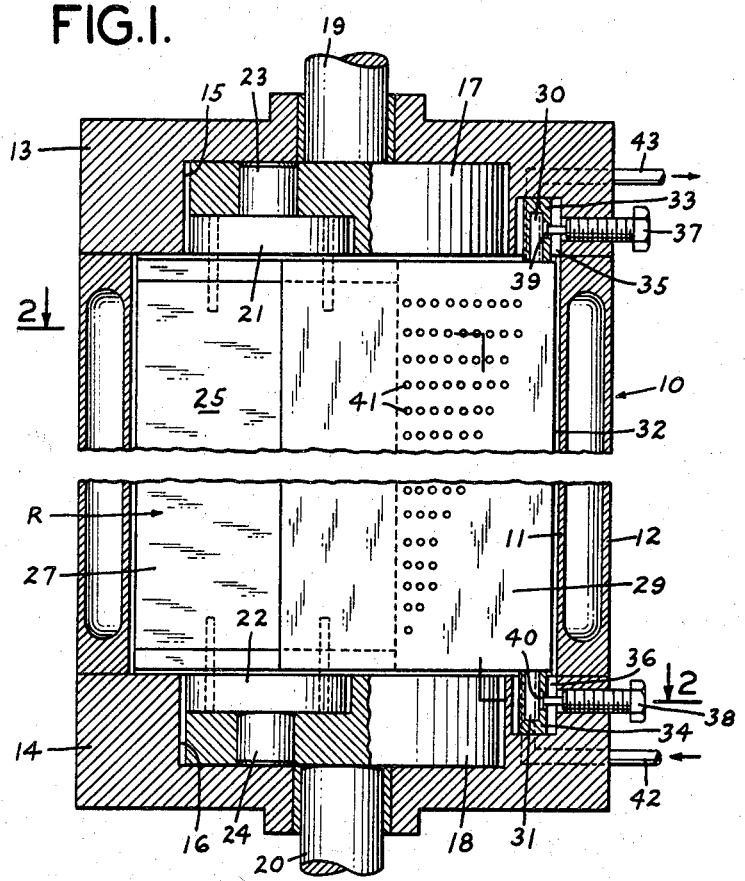
FIG.2.
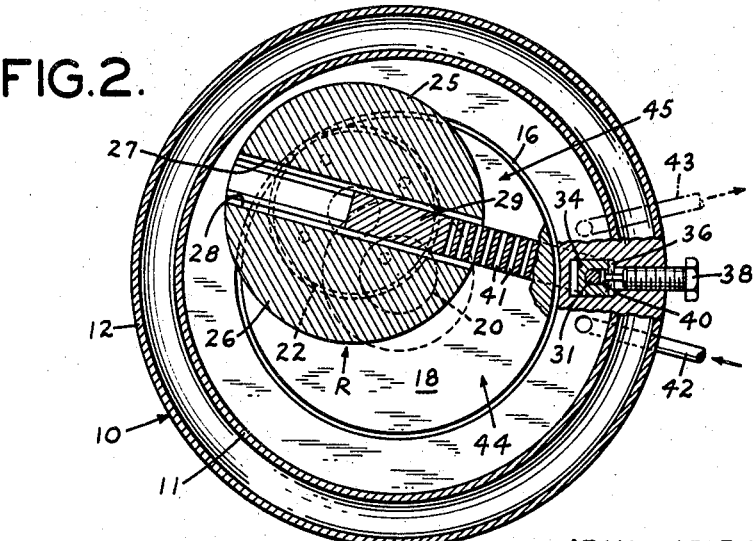
INVENTOR
JEAN-MARIE MASSOUBRE
BY
HIS ATTORNEYS United States Patent Office
3,386,809
Patented June 4, 1968

3,386,809
REACTOR AND MIXER FOR CONTINUOUS POLYMERIZATION
Jean-Marie Massoubre, Clermont-Ferrand, France, assignor to Compagnie Generale des Etablissements Michelin, raison sociale Michelin & Cie, Clermont-Ferrand, France
Filed Jan. 27, 1966, Ser. No. 523,302
Claims priority, application France, Feb. 1, 1965, 3,890
3 Claims. (Cl. 23—285)

ABSTRACT OF THE DISCLOSURE

A reactor and mixer for continuous polymerization and the like, including a cylindrical reaction chamber and a partition structure therein capable of oscillating movement and as an incident of its movement wiping the walls of the reaction chamber and the partition to assure uniformity in the reaction mixture and uniform flow through the chamber, the partition being composed of a pivoted vane slidingly received in a rotor which is gyrated in the reaction chamber and the vane being provided with apertures therethrough which are progressively covered and uncovered during the gyration of the rotor to promote cross flow through the vane and mixing of the reagents in the chamber.

---

This invention relates to improvements in apparatus for conducting chemical reactions and more particularly to improvements in reactors for the production of polymers such as, for example, polyurethane, polystyrene, polybutadiene, polyisoprene, polyisopropylene and the like, and also for mixing liquids and the like.

In the Massoubre et al. U.S. Patent No. 3,060,160 are described polymerization processes which involve the displacement with a uniform movement of a mixture being treated during a polymerization reaction to the end that the residence time in the reactor is essentially the same for all of the mixture passing through the reactor. In order to achieve this result, it is necessary to prevent the retrogressive movement of the mixture in the reactor and also to prevent the retention of mixtures along the walls of the reactor due to the skin friction effect of the surfaces and, moreover, to avoid any tendency of the mixture nearer the walls to react unevenly due to a different temperature immediately adjacent the wall of the reactor.

In the Massoubre U.S. application Ser. No. 375,862 filed June 17, 1964, is disclosed a reactor by means of which the uniform residence time of the reaction mixture is promoted and in which the mixture is caused to flow without retrogressive motion along the length of the reactor while the walls of the reactor are being scraped or cleared of material adjacent thereto to assure the homogeneity of the mixture.

The present invention is an improvement in reactors in which not only the homogeneity and uniform flow without retrogressive motion is assured, but which is capable of producing a gentle mixing and pumping action to assist in the steady and uniform flow of the reaction mixture through the reaction chamber and which may also be used, when desired, as a mixer for the production of homogeneous mixtures of liquids and the like.

More particularly, in accordance with the present invention, the reactor includes a chamber having a partition mounted therein which is capable of oscillating in the reaction chamber and, as an incident of its oscillating movement, wiping the walls of the reaction chamber and the partition to assure uniformity in the reaction mixture and promote its flow in a continuous and uniform manner throughout the reaction chamber. The reactor may also be used as a mixer by introducing materials therein and operating it with the inlet and outlet closed whereby a powerful mixing action occurs with the assurance of the production of a uniform mixture which can be drained completely from the reaction chamber when mixing is completed.

In a preferred form of the present invention, the partition is a two-part structure, one part thereof being pivotally mounted near one wall of the reaction chamber and slideably received in another rotating or gyrating portion which is positioned to sweep or scrape the walls of the container during its gyrating movement. The pivoted partition and the gyrating portion or rotor thereof divide the reaction or mixing chamber into two sections which vary in capacity between substantially zero and a maximum as gyrating and pivoting movement of the partition takes place in the chamber. With this arrangement, when a reaction mixture is introduced into the chambers, and as the capacity of the chambers varies, additional material is drawn into one chamber while the reaction mixture is being discharged from the other chamber so that a flow of the material takes place without substantial vertical agitation and retrograde movement of the mixture in the chambers, whereby a uniform residence time is provided in the reactor.

When used as a mixer, flow of liquid takes place from one chamber to the other as the partition oscillates and gyrates within the reaction chamber, thereby forcing the liquid back and forth between the chambers and thoroughly mixing them. In this way, the apparatus can be readily used either as a reactor in producing a uniform reaction product or a mixer producing a homogenous mixture of liquids and the like.

For a better understanding of the present invention, reference may be had to the accompanying drawings, in which:

FIGURE 1 is a view in vertical section through a typical reactor-mixer of the type embodying the present invention, and FIGURE 2 is a view in cross-section taken on line 2—2 of FIGURE 1.

In the illustrative form of the reactor-mixer shown in FIGURE 1, a cylindrical shell or jacket 10 is provided having an inner wall 11 and a spaced outer wall 12 between which liquid or vapor can be circulated to regulate the temperature within the reactor. Head plates 13 and 14 are connected to the opposite ends of the jacket 10 in hermetically sealed relation thereto. Within recesses 15 and 16 in the heads 13 and 14 are mounted rotary disks 17 and 18 provided with supporting shafts 19 and 20, either or both of which may be driven by an external power source such as a motor or the like, not shown. Rotatably mounted in the opposing faces of the disks 17 and 18 and eccentric to their axes are the support or carrier disks 21 and 22 which have stub shafts 23 and 24 journalled in the disks 17 and 18. Mounted on the disks 21 and 22 is a rotor R including a pair of semi-cylindrical partition members 25 and 26 having their flat faces 27 and 28 in spaced-apart, substantially parallel relation to receive therebetween, with a slide fit, a flat vane 29 which is pivotally supported adjacent the inner wall 11 of the reaction chamber. The vane 29 has upwardly and downwardly extending pivot pins 30 and 31 adjacent to one edge 32 thereof, these pivot pins being received in pivot blocks 33 and 34 which are mounted for substantially radial movement in recesses 35 and 36 in the heads 13 and 14 of the reactor. Screw threaded members 37 and 38 are threaded in bores in the heads 13 and 14 and have headed extensions 39 and 40 thereon which are engaged rotatably in the blocks and enable radial adjustment of the pivot blocks 35 and 36 upon adjustment of the threaded members 37 and 38 to regulate the spacing of the edge 32 of the vane 29 relative to the wall 11. A series of apertures 41 extend through the right-hand portion of the vane 29, the number of apertures increasing from the bottom toward the top of the vane and being disposed so that all of the apertures are uncovered when the vane 29 extends diametrically of the reaction chamber and being covered partially or completely by the rotor R in other positions of the vane in the reaction chamber.

An inlet 42 for a reaction mixture or liquids to be mixed extends through the head 14 and an outlet 43 for a reaction mixture is formed in the head 13 at the top of the reaction chamber.

When the apparatus is used in a chemical reaction, such as a polymerization reaction, the reaction mixture is introduced through the inlet 42 and the shafts 19 and 20, or one of them, are driven to cause the disks 17 and 18 to rotate. As a result, the rotor R gyrates eccentrically around the chamber in or substantially in contact with the wall 11 causing the vane 29 to rock back and forth or oscillate around its pivots 30 and 31 while moving into and out of the slot between the semi-cylindrical sections 25 and 26 of the rotor R. By this action, it will be apparent that the chambers 44 and 45 on opposite sides of the rotor R and vane 29 will increase and decrease in capacity, thereby producing a pumping action which will assist in the flow of the reaction mixture from the inlet 42 to the outlet 43. Inasmuch as the change in capacities of the two chambers 44 and 45 is not quite uniform, the apertures 41 will allow some cross-flow from one chamber to another as gyration continues. During the gyrating action of the rotor R, it will sweep the inner surfaces of the wall 11 and thereby dislodge any of the reaction mixture which might be retained thereon or move more slowly than the remainder of the mixture due to skin friction or by reacting and changing in viscosity faster than the remainder of the reaction mixture in the same horizontal plane. Inasmuch as the reaction mixture usually will have a higher viscosity adjacent the outlet 43 than at the inlet, the number of apertures 41 in the vane is larger near the top of the vane 29 than at the bottom to permit a uniform flow therethrough. Any mixing action which is produced by flow-through of material thus is in horizontal planes which does not cause a retrograde movement of the reaction mixture in the reactor. A similar result can be achieved by inclining the edge 32 of the vane 29 so that its lower end is closer to the wall 11 than its upper end to provide, in effect, a tapering gap between the edge 32 and the wall 11. Further adjustments of spacing to control flow-through and enable complete emptying of the reaction chamber can be made by adjusting the position of the pivot blocks 33 and 34, and the edge 32 of the vane 29 relative to the wall 11, as described above.

When the apparatus is to be used as a mixer, the materials are introduced through the inlet 42 or the outlet 43 and, after the reaction chamber is filled, the inlet and outlet are closed by means of suitable valves, not shown. The shaft 19 or 20, or both, is then rotated with the result that material present in the chamber 14 is forced through the apertures 41 and through any clearances between the edge 32 of the vane 29 and the wall 11 and the surface of the rotor R. As the vane oscillates and the rotor gyrates, material is forced back and forth through the apertures and past the rotor and edge of the partition so that a thorough and uniform mixing of the materials is assured. When the mixing operation is completed, the inlet and outlet can be opened, and the mixture drained from the chamber. By spacing the edge 32 of the vane slightly from the wall 11, the mixture can be drained completely from both of the chambers 44 and 45.

It will be understood that the embodiment of the invention described above is illustrative and that variations can be made therein in the dimensions and proportions of the reaction chamber, the arrangement of the apertures through the vane and the construction and arrangement of the rotor R and vane 29, depending upon requirements. Accordingly, all such variations and modifications are intended to be within the scope of the invention as defined in the following claims.

I claim:

1. A reactor and mixer comprising a substantially cylindrical hollow shell, a partition in and connected to said shell and spanning said shell lengthwise and transversely, said partition including a vane portion having one edge adjacent to and pivotally connected to said shell adjacent one side thereof, and a rotor portion telescopically receiving said vane portion and movable around the interior of said shell substantially in wiping engagement with said shell and means for moving said rotor portion and said vane portion, means for introducing material into and discharging it from said shell, and apertures extending through said vane portion and covered and uncovered by said rotor portion during movement of said rotor portion.

2. The reactor set forth in claim 1 in which the number of apertures through said vane portion increases lengthwise of said vane portion.

3. A reactor and mixer comprising a substantially cylindrical hollow shell, a partition in and connected to said shell and spanning said shell lengthwise and transversely, said partition including a vane portion having one edge adjacent to and pivotally connected to said shell adjacent one side thereof, and a rotor portion telescopically receiving said vane portion and movable around the interior of said shell substantially in wiping engagement with said shell and means for moving said rotor portion and said vane portion, means for introducing material into and discharging it from said shell, a rotatable carrier substantially coaxial with said shell, means supporting said rotor portion on said carrier for rotation about an axis spaced radially from the axis of said carrier, said rotor portion having a substantially diametrical slot therein slidably receiving said vane portion, and means for adjusting the spacing between said one edge of said vane portion and said shell.

References Cited

UNITED STATES PATENTS 236,173  1/1881  Mellor _____ 103—132

JAMES H. TAYMAN, Jr., *Primary Examiner.*